US006253367B1

(12) United States Patent
Tran et al.

(10) Patent No.: US 6,253,367 B1
(45) Date of Patent: Jun. 26, 2001

(54) METHOD AND SYSTEM FOR TRANSFORMING DYNAMIC CONTENT FOR USE ON THE INTERNET

(75) Inventors: Kyle Tran; Kiet Dieu, both of Plano, TX (US)

(73) Assignee: Micrografx, Inc., Richardson, TX (US)

( * ) Notice: Subject to any disclaimer, the term of this patent is extended or adjusted under 35 U.S.C. 154(b) by 0 days.

(21) Appl. No.: 09/195,802

(22) Filed: Nov. 18, 1998

(51) Int. Cl.[7] .................................................. G06F 9/45
(52) U.S. Cl. ................... 717/2; 717/5; 345/333; 707/513
(58) Field of Search .................. 717/1, 2, 5, 10; 707/103, 200, 513, 522, 523, 524; 345/333–339

(56) References Cited

U.S. PATENT DOCUMENTS

| 5,297,285 | | 3/1994 | Abrahamsson et al. | 395/700 |
|---|---|---|---|---|
| 5,325,533 | | 6/1994 | McInerney et al. | 395/700 |
| 5,339,392 | * | 8/1994 | Risberg et al. | 345/333 |
| 5,369,778 | * | 11/1994 | Soucie et al. | 707/103 |
| 5,375,241 | | 12/1994 | Walsh | 395/700 |
| 5,499,371 | | 3/1996 | Henninger et al. | 395/700 |
| 5,515,490 | * | 5/1996 | Buchanan et al. | 395/807 |
| 5,519,866 | | 5/1996 | Lawrence et al. | 395/700 |
| 5,608,908 | | 3/1997 | Barghouti et al. | 395/703 |
| 5,634,124 | * | 5/1997 | Khoyi et al. | 707/103 |
| 5,649,204 | | 7/1997 | Pickett | 395/710 |
| 5,659,751 | | 8/1997 | Heninger | 395/685 |
| 5,675,804 | | 10/1997 | Sidik et al. | 395/705 |
| 5,680,619 | | 10/1997 | Gudmundson et al. | 395/701 |
| 5,790,855 | * | 8/1998 | Faustini | 395/701 |
| 6,101,509 | * | 8/2000 | Hanson et al. | 707/513 |

OTHER PUBLICATIONS

Campbell, "Objectvision 2.0", Compute, Jul. 1992, pp 104–105.*

Jolin et al., "Designing class liobraries for Visual builders", Dr. Dobb's Journal, Jun. 1998, pp 38–43.*

* cited by examiner

Primary Examiner—Kakali Chaki
(74) Attorney, Agent, or Firm—Baker Botts L.L.P.

(57) ABSTRACT

Dynamic content is transformed for use on the Internet by receiving an object and a feature for the object in a non-Internet format. The feature specifies an event and an action to be performed in connection with the object in response to the event. The object and the feature are converted into an Internet format. The object and the feature are encapsulated in the Internet format in an Internet file operable in an Internet environment to perform the action in connection with the object in response to the event.

20 Claims, 3 Drawing Sheets

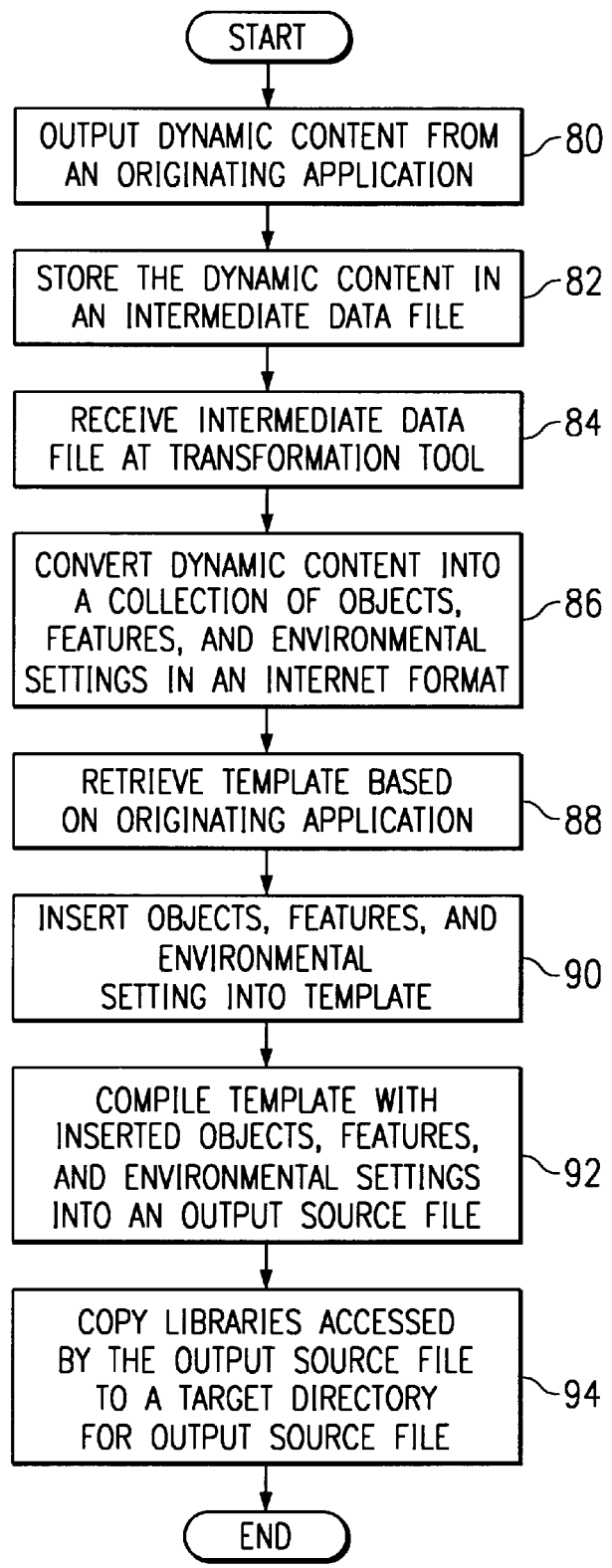

US 6,253,367 B1

METHOD AND SYSTEM FOR TRANSFORMING DYNAMIC CONTENT FOR USE ON THE INTERNET

TECHNICAL FIELD OF THE INVENTION

This invention relates generally to provisioning data for a network, and more particularly to a method and system for transforming dynamic content for use on the Internet.

BACKGROUND OF THE INVENTION

Many computer applications allow a user to create and store dynamic content in which items are altered or acted upon based on user or other input at execution time. For example, an item may change color, shape, or turn into another item in response to a user positioning a mouse over the item or selecting the item. The use of dynamic content allows increased and more intuitive interaction between the user and a computer system.

Due to the strict standards and conventions governing data format on the Internet, dynamic content generated by many applications cannot be published or otherwise used on the Internet. As a result, the dynamic content must typically be regenerated in the Internet format which is both time consuming and costly. In addition, special Internet applications or compilers used to generate the dynamic content in an Internet format are often non-intuitive and unfamiliar to the user. As a result, the user must often learn to use new applications and programming languages such as hypertext markup language (HTML), Java, and the like in order to publish information over the network.

SUMMARY OF THE INVENTION

The present invention provides a method and system for transforming dynamic content for use on the Internet that substantially reduces or eliminates disadvantages and problems associated with prior systems and methods. In particular, the present invention converts new or existing dynamic content generated in a non-Internet format by a general purpose application into an Internet format that can be transmitted, received, and presented over the Internet.

In accordance with one embodiment of the present invention, dynamic content is transformed for use on the Internet by receiving an object and one or more features for the object in a non-Internet format. The feature specifies an event and an action to be performed in connection with the object in response to the event. The object and the feature are converted into an Internet format and then encapsulated in an Internet file operable in an Internet environment to perform the action in connection with the object in response to the event.

More specifically, in accordance with a particular embodiment of the present invention, the object and its features are encapsulated in the Internet file by retrieving a template and inserting the object and feature into the template. The template and inserted object and feature are compiled to generate an output source file. In this and other embodiments, supporting libraries are linked to the source file. The supporting libraries are accessed by the source file and support dynamic presentation of the object over the Internet. The source file may be a self-contained Java applet or script file for use in connection with an applet player.

Technical advantages of the present invention include providing an improved method and system for publishing dynamic content over the Internet. In particular, new or existing dynamic content generated in a non-Internet format may be automatically converted into an Internet format. Accordingly, dynamic content from virtually any type of application may be published or otherwise used over the Internet. Thus, a user may use applications with which he or she is familiar to generate dynamic content for publication on the Internet and may convert existing files for use on the Internet. In addition, the user need not separately generate files for local and network publication.

Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following brief description, taken in conjunction with the accompanying drawings and detailed description, wherein like reference numerals represent like parts, in which:

FIG. 3 is a flow diagram illustrating a process for transforming dynamic content for use in the Internet environment of FIG. 1 in accordance with one embodiment of the present invention.

DETAILED DESCRIPTION OF THE INVENTION

Figure 1:
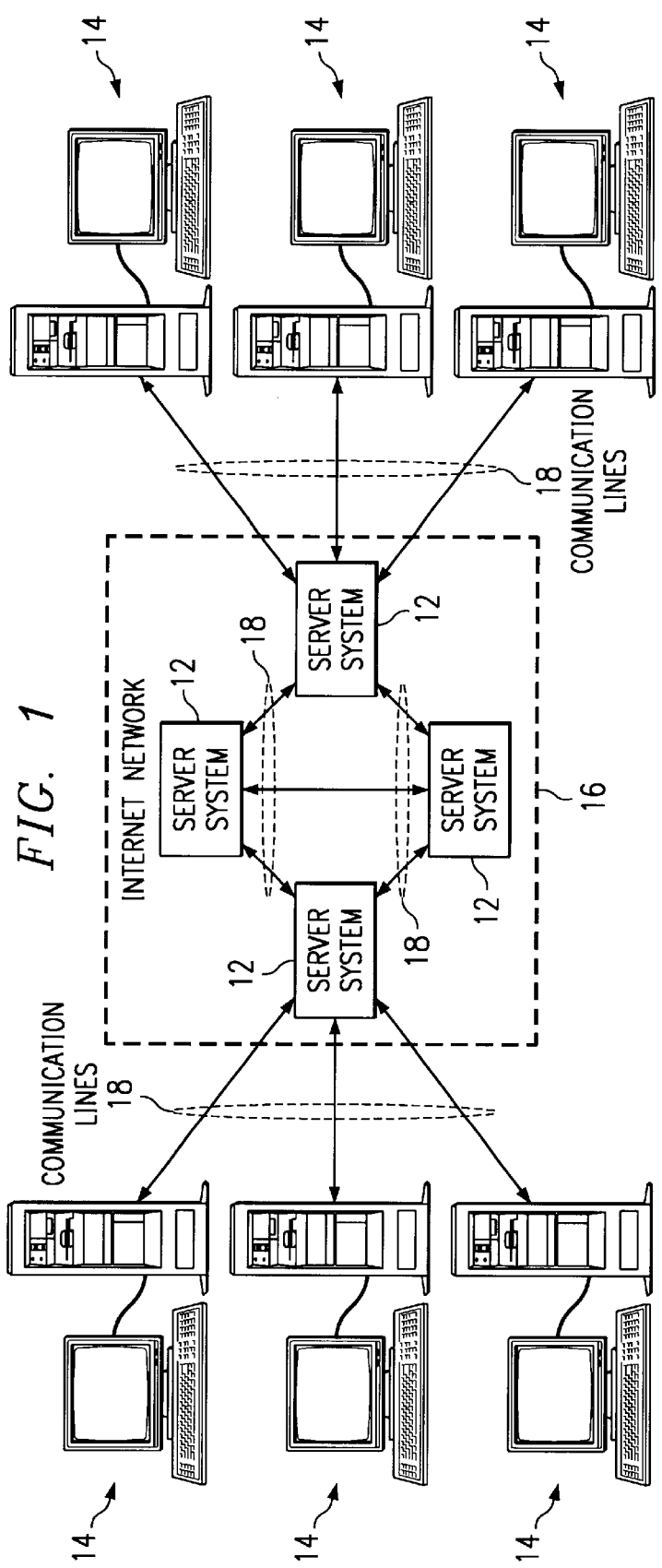
FIG. 1 is a block diagram illustrating a network environment for presenting dynamic content in accordance with one embodiment of the present invention.

FIG. 1 is a block diagram illustrating an Internet environment 10 for presenting dynamic content in accordance with one embodiment of the present invention. Referring to FIG. 1, the Internet environment 10 includes a server system 12 connected to a client system 14 by a network 16.

The server system 12 is a computer such as a personal computer, file server, workstation, minicomputer, mainframe or any general purpose or other computer capable of communicating and interconnecting with other computers. Generally described, the server system 12 includes an input/output system, processor or processors, and memory. The input devices may include a pointing device such as a mouse, a keyboard, or the like. The output devices may include a monitor, a printer, or the like. The server system 12 has connections to other server systems 12 and client systems 14 through communication lines 18 as shown in FIG. 1.

The client system 14 is similar to the server system 12 and may be implemented using virtually any type of computer. The client system 14 is preferably a personal computer having input/output devices, a processor, and memory. The client system 14 may use MacIntosh OS, Windows NT, Windows 95, OS/2, or any other operating system capable of providing a graphical or other suitable user interface. As previously described in connection with the server system 12, the client system 14 is connected to the server system 12 with communication lines 18.

Communication lines 18 may be any type of communication link capable of supporting data transfer. In one embodiment, the communication lines 18 may include any combination of an Integrated Services Digital Network (ISDN) communication line, a hardwire line, or a telephone link.

The network of interconnecting server systems 12 form the Internet network 16. The Internet 16 includes a plurality of communication lines 18 connecting between a plurality of server systems 12 and a plurality of client systems 14. The client system 14 may be directly connected to the server system 12 or may be connected through a data transmission device such as a modem or the like. A web browser is a software application residing on the client system 14 used to communicate between the server system 12 on the Internet network 16. The protocol that the browser uses to communicate between the server system 12 and the client 14 is called hypertext transfer protocol (HTTP). A description referencing to a resource on a server system 12 within the Internet network 16 is a uniform resource locator (URL). The purpose of a URL is to direct client systems 14 to the proper server system 12 where the requested resource is stored.

Figure 2:
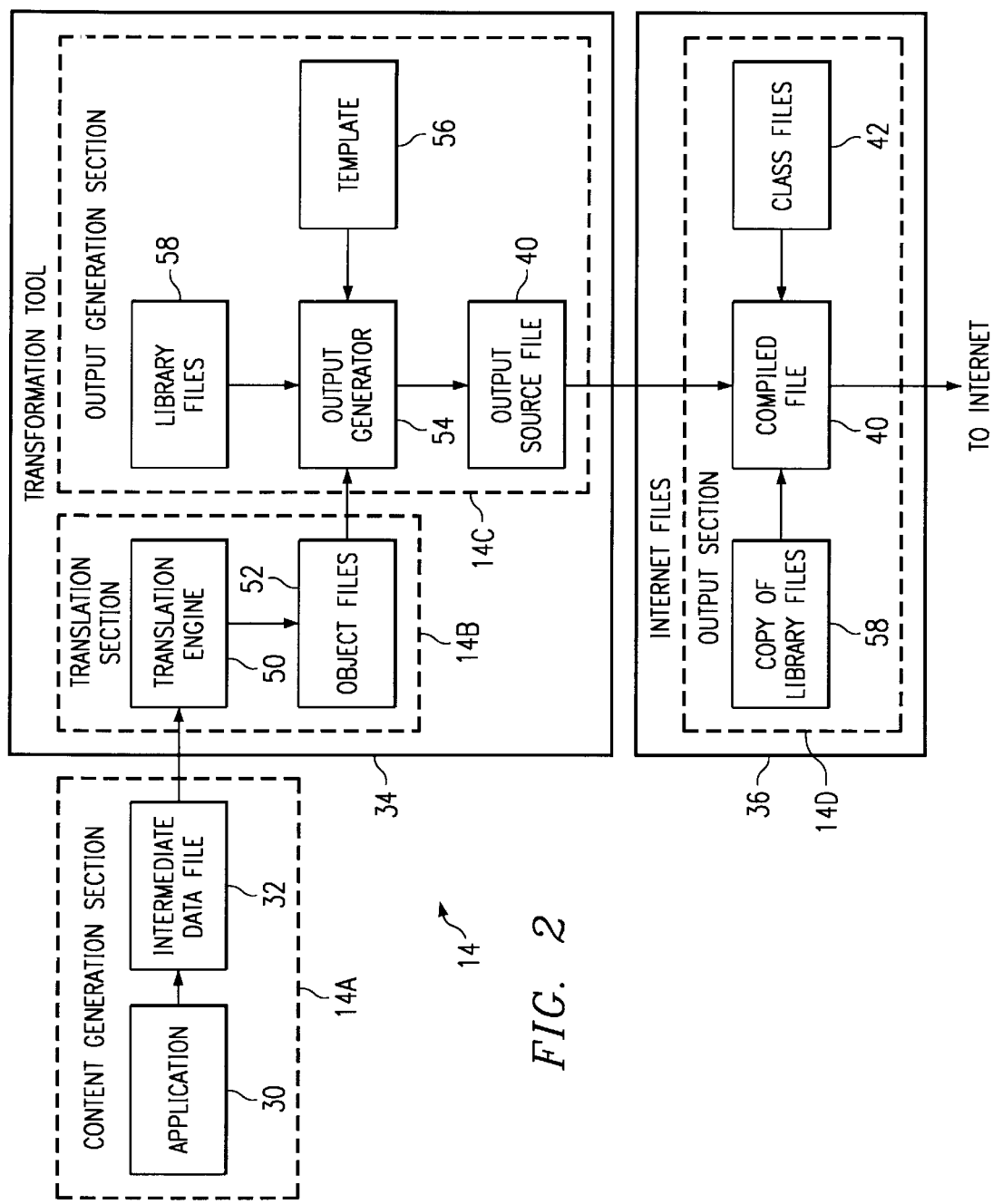
FIG. 2 is a block diagram illustrating details of the client system of FIG. 1.

FIG. 2 is a block diagram illustrating details of the client system 14 of FIG. 1. Generally described, the client system 14 includes computer software that is loaded into memory and executed by the processor. The computer software is generally identified by applications, files, engines and other modules and similar systems in memory. It will be understood that the computer software may be otherwise combined and/or divided for processing without departing from the scope of the present invention. Accordingly, the labels of the software systems are for illustrative purposes and may be suitably varied. The computer software is loaded into memory from disk storage (not shown). Disk storage may include a variety of types of storage media. For example, disk storage may include floppy disk drives, hard disk drives, CD/ROM drives, or magnetic tape drives.

The client system 14 includes a plurality of disparate applications 30, intermediate data files 32 generated by the applications 30, and a transformation tool 34 for generating an Internet file 36 based on an intermediate data file 32. Generally described, the applications 30 are used to generate dynamic content which is saved to the intermediate data files 32. The transformation tool 34 converts the dynamic content into an Internet format which is then encapsulated in the Internet file 36. As described in more detail below, the Internet file 36 includes an output source file 40 and a set of class files 42.

The applications 30 may each be any type of suitable application capable of generating dynamic content having interactive or other dynamic objects that are altered or acted upon based on user or other input at execution time. Dynamic content is stored as an object and one or more features for the object. The features specify an event and an action to be performed in connection with the object in response to the event. As used herein, identified objects, features, events, actions, and information include those objects, features, events, actions, and information, any representations of or based on those objects, features, events, actions, or information, and any previous or subsequent forms of those objects, features, events, actions, and information. Environmental settings and other suitable information related or pertaining to the objects or features or the rendering or displaying of the objects or features may be included along with or as part of the dynamic content. As shown by FIG. 2, in a dynamic content generation section 14A of the client 14, the dynamic content generated by an application 30 is output to an intermediate data file 32 for transformation to an Internet format upon request by the user from a file menu, toolbar or other suitable option in the application 30.

In one embodiment, the applications 30 may be Micrografx DESIGNER and FLOW-CHARTER, manufactured by Micrografx, Inc. of Richardson, Tex., the assignee of the present application. For the Micrografx DESIGNER application, for example, the events may be user-initiated events such as On Mouse Enter, On Mouse Leave, On Mouse Down, On Mouse Up, and On Load. The On Mouse Enter event is initiated when a mouse pointer is moved over an object. The On Mouse Leave event is initiated when a mouse pointer is moved away from the object. The On Mouse Down event is initiated when a mouse button is depressed while over the image of the object. The On Mouse Up event is initiated when the mouse button is released while over the object. The On Load event is initiated when the Internet file 36 containing the object is open.

Also for the Micrografx DESIGNER application, the actions may include Jump, In Place Jump, Status Line, Cursor Shape, Object Color, Object Text, Move Over, Hide Object, and Show Object. The Jump action instructs a browser to load and display a newly specified URL. The In Place Jump action instructs a plug-in to discard its contents and display a newly specified drawing. The Status Line action displays a text string in a browser status bar. The Cursor Shape action sets the shape of a cursor on a monitor. The Object Color action sets an interior-fill color of the object to a specified color. The Object Text action sets text of the object to a specified text. The Move Over action moves a center of the object to a specified position. The Hide Object and Show Object actions hide or show the object. It will be understood that other suitable events and actions may be generated by the applications 30 and supported by the transformation tool 34.

The intermediate data files 32 each store dynamic content generated and outputted by an application 30 for use by the transformation tool 34. Accordingly, the data files 32 are intermediate in that they are used to convey the rendering information and the dynamic content from the application 30 to the transformation tool 34 for further processing. The intermediate data files 32 may be physical files in permanent or temporary memory, a portion of a shared memory accessible by the application 30 and the transformation tool 34, a network transmittable file operable to be accessed by a remote transmission tool 34, or other suitable type of file or medium capable of providing the transformation tool 34 with access to the dynamic content generated by the applications 30.

The intermediate data files 32 store objects, features, and environmental settings for the dynamic content generated by the applications 30. The intermediate data files 32 may also store an identity of the originating application 30 and other suitable information used by the transmission tool 34 in generating the Internet file 36. In one embodiment, the data files 32 are Enhanced Meta Files (EMF). In this embodiment, objects and associated features and settings are stored as instructions for rendering or performing the objects, features, and settings. Thus, for example, an object may be stored by identifying its tool and functions to be performed with that tool. The dynamic content, objects, features, and environment settings may be otherwise suitably stored in the intermediate data files 32.

In the intermediate data files 32, dynamic content is preferably stored in a neutral format that is standardized and device independent. In this way, the intermediate data files 32 may be standardized and used in connection with virtually any type of application 30. If the format of the intermediate data file 32 does not support execution of dynamic content, the dynamic content may be stored in a non-executable format. Thus, the features or a portion of the features for objects may be stored as comments, in a comment section, or be appended to the intermediate data file 32.

The transformation tool 34 includes a translation engine 50, an internal objects file 52, an output generator 54, a set of template files 56, and a set of library files 58. Generally described, in translation section 14B of the transformation tool 34, the translation engine 34 processes an intermediate data file 32 and generates a collection of the objects, features, and environmental settings that is stored in the internal objects file 52. In the output generation section 14C of the transformation tool 34, the output generator 54 selects a template 56 for the dynamic content based on the originating application 30 and inserts the objects, features, and environmental settings from the internal objects file 52 into the template 56 and compiles the template 56 to generate the output source file 40 for the Internet file 36.

More particularly, the translation engine 50 decomposes the intermediate data file 32 into discrete elements and translates the discrete elements into the collection of objects, features, and settings in an Internet format using well known techniques. The Internet format can be Java classes and hypertext markup language (HTML) or other suitable language operable to be executed in the Internet environment 10. The files can be compressed into a single file or left uncompressed in multiple files. The collection of objects, features, and settings is stored in the Internet format in the internal objects file 52 for access by the output generator 54.

In the internal objects file 52, the objects, features, and settings are stored in discrete containers designed for insertion into the template file 56. In one embodiment, the object containers each include the type, size, and position of the object. The feature containers each include an event and action associated with an object. The setting containers each include page information such as size, background, and the like.

The output generator 54 assembles necessary resources and generates the Internet file 36. The output generator 54 may be integral with or separate from the translation engine 50. In operation, the output generator 54 selects a template 56 for the collection of objects, features, and settings in the internal object file 52, inserts the objects, features, and settings into the template, and compiles the template with the inserted information to generate the output source file 40. The output generator 54 further links precompiled libraries 58 accessed by the output source file 56 with the output source file 40 during compile time, and also copies those libraries 58 to a target directory for the output source file 40 for use during execution time.

The template files 56 each provide a predefined feature set to support a type or set of dynamic content. In one embodiment, each template file 56 includes a predefined feature set to support dynamic content generated by a particular type of application. In this embodiment, a template file 56 is provided for each type of application 30 supported by the transformation tool 34 and the output generator 54 selects a template based on the originating application 30.

Each template 56 includes one or more sections with markers for inserting objects, features, and setting containers. In a particular embodiment, templates 56 include an initialization section, a render section, and an addition section. Each section includes code that supports rendering and dynamic activity of the inserted objects. Preferably, the templates 56 are coded in an Internet format compatible with the format of the intermediate object file 52. Thus, for the Java embodiment of the intermediate objects file 52, the template files 56 are also coded in Java.

The library files 58 are each precompiled code to support particular object and feature types. For example, a library 58 may support zoom, pan, rotate, next, previous, first, last, and other features. As previously described, supporting library files 58 that are accessed by the output source file 40 are copied by the output generator 54 and form the class files 42 for access by the output source file 40. For the Java embodiment, the libraries 58 are precompiled Java files.

As shown in the output section 14D of the client 14, the Internet file 36 includes the output source file 40 and class files 42. As previously described, the output source file 40 is a compile template with inserted objects, features, and settings. The class files 42 are a collection of supporting libraries 58 accessed by the output source file 40 and copied to a target directory by the output generator 54. The Internet file 36 may be uploaded and presented over the Internet 16. Accordingly, dynamic content may be generated by virtually any type of application 30 with which a user is familiar. In addition, existing files need not be manually reprogrammed for use on the Internet 16.

In one embodiment, the Internet file 36 is a self-contained executable applet that may be transferred and displayed on the Internet 16 by a standardized browser. This minimizes the resource requirements for the browser but results in an enlarged and customized file. In addition, as new features are added, those features are provided by the applet and are therefore independent of the browser.

In another embodiment, Internet file 36 may be a smaller script file that is loaded and played by an applet player. In this embodiment, the output player needs to contain all the features that it expects to play regardless of whether the script file utilizes those features. In addition, the applet player may only display what it is designed to present and a new applet player must be generated and downloaded for new features to be available.

FIG. 3 is a flow diagram illustrating a method for transforming dynamic content for use on the Internet 16 in accordance with one embodiment of the present invention. Referring to FIG. 3, the method begins at step 80 in which dynamic content is outputted from an originating application 30. The dynamic content includes objects, features, and environmental settings. Next, at step 82, the dynamic content is stored in an intermediate data file 32. As previously described, the intermediate data file 32 may be a permanent or temporary file, portion of shared memory or a network transmittable file.

Proceeding to step 84, the intermediate data file 32 is received by the transformation tool 14. In an embodiment where the intermediate data file 32 is pre-existing file, the method may begin at this step. At step 86, the translation engine 50 converts the dynamic content of the intermediate data file 32 into a collection of objects, features, and environmental settings in an Internet format. The objects are stored into discrete containers in the internal object file 52 for insertion into a predefined template 56.

Next, at step 88, the output generator 54 retrieves a template 56 based on the originating application 30. At step 90, the object, feature, and setting containers are inserted into the template 56 by the output generator 54. The object, features, and environmental settings may each be inserted into one or more sections of the template 56. In one embodiment, code for the environmental settings is first inserted followed by code for the objects and features. At step 92, the output generator 54 compiles the template 56 with the inserted objects, features, and environmental settings into the output source file 40.

Proceeding to step 94, the output generator 54 copies supporting libraries 58 accessed by the output source file 40 to a target directory for the output source file 40. The libraries 58 support particular object and feature types included within the output source file 54. Step 94 leads to the end of the process by which dynamic output of an application 30 is accurately and efficiently translated to an Internet format with minimal user interaction. The conversion may be automatic upon selection of an Internet output in the application or a separate process for processing previously generated dynamic outputs. As used herein, an event is automatic in that the event is predefined and carried out by the computer process. The event may be immediate or in response to a user action or other suitable event.

Although the present invention has been described with several embodiments, various changes and modifications may be suggested to one skilled in the art. It is intended that the present invention encompass such changes and modifications as fall within the scope of the appended claims.

What is claimed is:

1. A method for transforming dynamic content for use on the Internet, comprising:

receiving an object and a feature for the object in a non-Internet format, the feature specifying an event and an action to be performed in connection with the object in response to the event;

converting the object and the feature into an Internet format; and encapsulating the object and the feature in the Internet format in an Internet file operable in an Internet environment to perform the action in connection with the object in response to the event.

2. The method of claim 1, wherein the Internet format is Java.

3. The method of claim 1, further comprising:

generating the object and the feature for the object in an application; and outputting the object and the feature from the application in the non-Internet format.

4. The method of claim 3, the act of outputting the object and the feature in the non-Internet format further comprising:

storing the object in an intermediate file; and storing at least part of the feature as non-executable code in the intermediate file.

5. The method of claim 4, wherein the non-executable code are comments in the intermediate file.

6. The method of claim 4, wherein the non-executable code is an appendage to the intermediate file.

7. The method of claim 4, wherein the intermediate file is incapable of storing the feature as executable code.

8. The method of claim 4, wherein the file is an Enhanced Meta File (EMF).

9. The method of claim 1, the act of encapsulation further comprising:

retrieving a template for the object and the feature; and generating an output source file by integrating the object and the feature into the template.

10. The method of claim 9, the act of integrating the object and the feature into the template further comprising:

inserting the object and the feature into the template at one or more predetermined locations; and compiling the template including the inserted object and feature.

11. The method of claim 9, further comprising linking a library to the output source file, the library operable to be accessed by the output source file to support display of the object in the Internet environment.

12. The method of claim 9, further comprising linking a library to the output source file, the library operable to be accessed by the output source file to support the feature in the Internet environment.

13. A system for transforming dynamic content for use on the Internet, comprising:

a translation engine operable to convert an object and a feature for the object in a non-Internet format into an Internet format, the feature specifying an event and an action to be performed in connection with the object in response to the event; and an output generator operable to encapsulate the object and the feature in the Internet format in an Internet file operable in an Internet environment to perform the action in connection with the object in response to the event.

14. The system of claim 13, further comprising an application operable to generate the object and the feature and to output the object and the feature in the non-Internet format.

15. The system of claim 14, further comprising an intermediate file storing the object and the feature, at least part of the feature being stored as non-executable code.

16. The method of claim 15, wherein the non-executable code are comments in the intermediate file.

17. The system of claim 15, wherein the non-executable code is an appendage to the intermediate file.

18. The system of claim 13, further comprising:

a template including at least one insertion point for each of the objects and the features; and the output generator operable to retrieve the template for the objects and the features and to insert the objects and the features into the template.

19. The system of claim 18, further comprising:

a library operable to be accessed by the source file and support dynamic presentation of the object on the Internet; and the output generator operable to link the library to the source file.

20. The system of claim 18, the output generator further comprising a compiler operable to compile the template including the inserted object and feature to generate the Internet file.

* * * * *